United States Patent [19]

Sobieski et al.

[11] Patent Number: 5,011,105

[45] Date of Patent: * Apr. 30, 1991

[54] COLLECTOR STAND

[75] Inventors: John L. Sobieski; Edward W. Bottum, both of Brighton, Mich.

[73] Assignee: Refrigeration Research, Inc., Brighton, Mich.

[ * ] Notice: The portion of the term of this patent subsequent to Aug. 30, 2003 has been disclaimed.

[21] Appl. No.: 66,045

[22] Filed: Aug. 13, 1979

[51] Int. Cl.⁵ .................................................. E04G 5/06
[52] U.S. Cl. ................................... 248/219.1; 248/231
[58] Field of Search ................. 248/201, 219.2, 219.4, 248/219.1, 218.4, 219.3, 230, 231, 121, 122; 126/417; 52/40, 697, 721; 211/107; 40/607

[56] References Cited

U.S. PATENT DOCUMENTS

| 102,633 | 5/1870 | Wheeler et al. | 126/417 X |
| 2,918,202 | 12/1959 | Constantine et al. | 248/231 X |
| 3,457,664 | 7/1969 | Handley et al. | 40/607 |
| 3,498,576 | 3/1970 | Alissandratos | 248/219.2 X |
| 4,151,971 | 5/1979 | Daly | 248/201 X |

FOREIGN PATENT DOCUMENTS 804073 11/1958 United Kingdom ................. 211/107

Primary Examiner—J. Franklin Foss

[57] ABSTRACT

A collector stand for a solar collector, including a frame adapted to be secured to the solar collector, a cylindrical end cap secured to the frame and adapted to be sleeved over the upper end of a mounting post for the solar collector, and structure securing the frame to the post in a location in spaced relation to the end cap. In one embodiment, the stand is adjustable so that the angle which the solar collector makes with the mounting post may be varied.

4 Claims, 2 Drawing Sheets

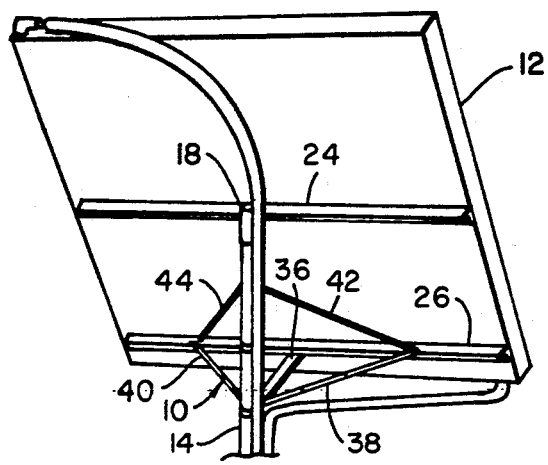
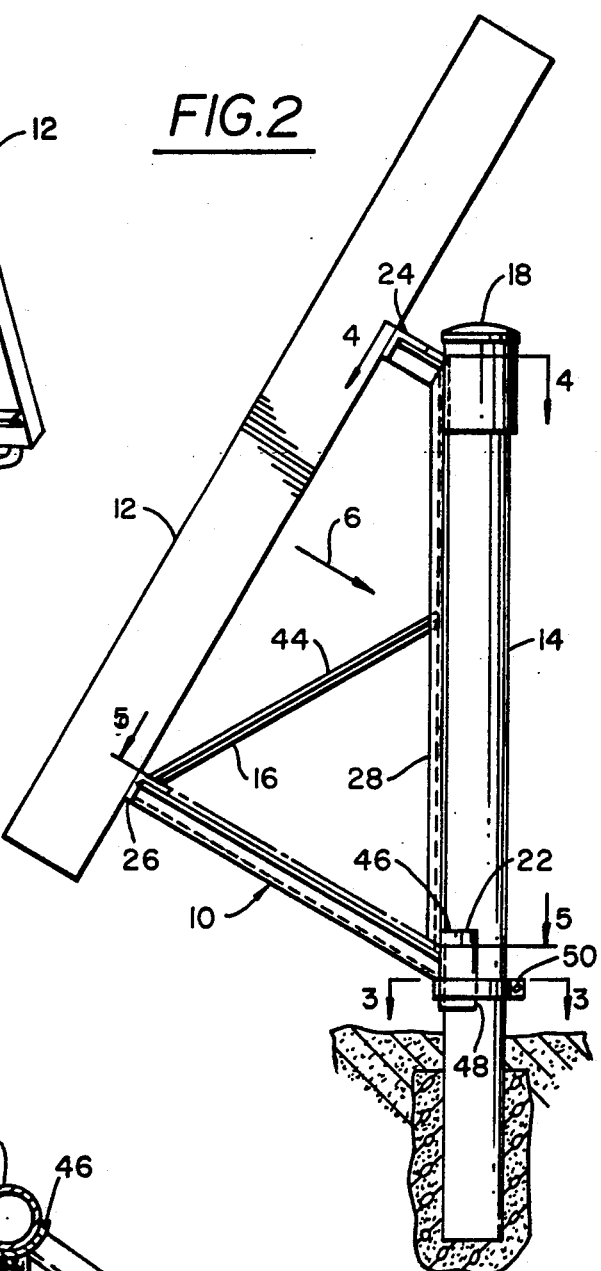
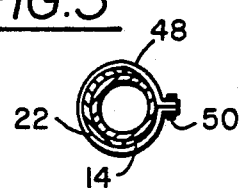
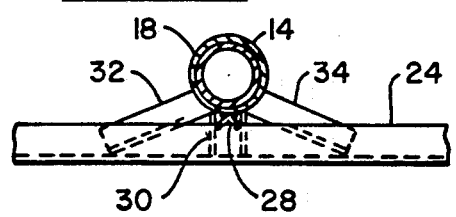
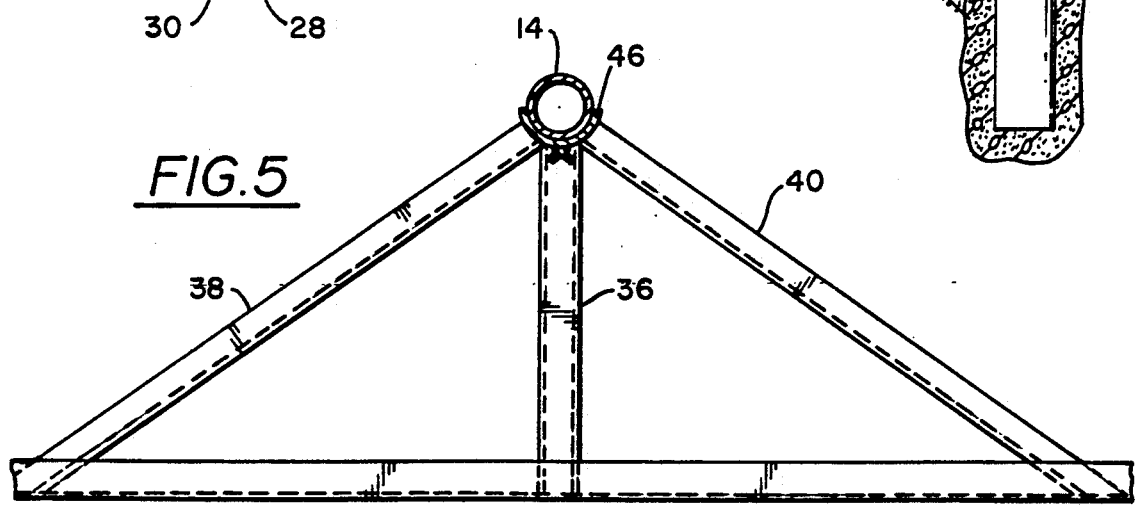

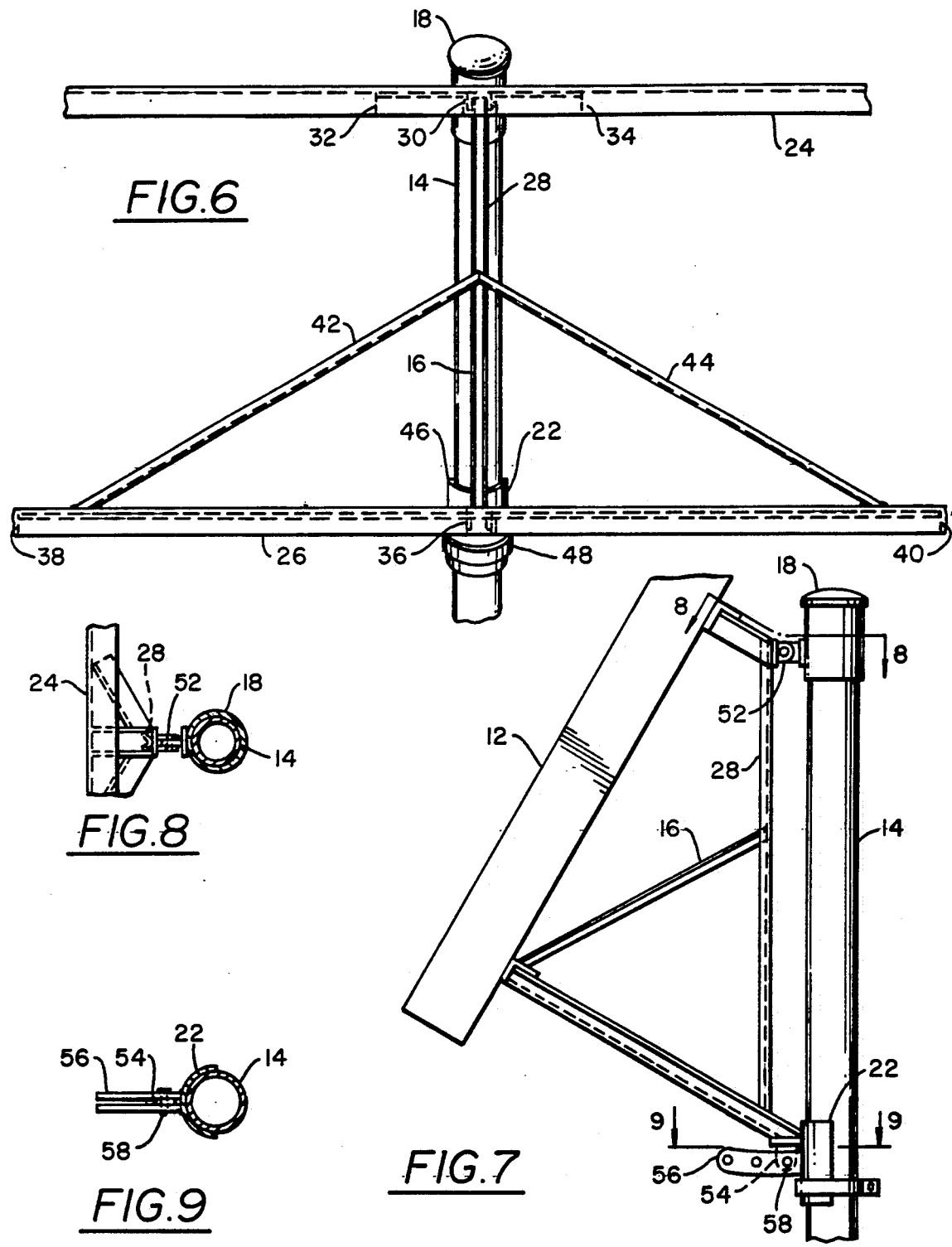

COLLECTOR STAND

BACKGROUND OF THE INVENTION

1. Field of the Invention

The invention relates to stands for solar collectors, and refers more specifically to a frame adapted to be secured to a solar collector, an end cap secured to the frame which is adapted to be sleeved over one end of a post for supporting the solar collector, and means for securing the frame to the post in spaced relation to the end cap.

2. Description of the Prior Art

In the past, stands for solar collectors and the like have sometimes included members adapted to be sleeved over a mounting post for securing the solar collectors in place. Such prior members have extended substantially the entire exposed length of the mounting post. Such structure has necessitated the lifting of the solar collectors substantially as high as the mounting post therefor before the cylindrical members of the collector stand are sleeved over the post. Such installation is extremely difficult or impossible without heavy equipment and/or a plurality of workmen when dealing with large solar collectors and/or during windy periods. At any time, such collector stands require the expending of more time and energy to install solar collectors on a mounting post than is necessary.

SUMMARY OF THE INVENTION

In accordance with the invention, there is provided a stand for mounting a solar collector on a mounting post which includes a frame adapted to be secured to the solar collector, a cylindrical end cap secured to the frame centrally of the solar collector, and means secured to the frame in spaced relation to the solar collector for abutting the mounting post in spaced relation to the end cap.

In one embodiment of the collector stand of the invention, the collector stand is adjustable so that the angle between the solar collector and the mounting post therefor may be varied.

With the collector stand structure of the invention, the solar collector and stand need be raised during installation of the solar collector on the mounting post only high enough so that the end cap will fit over the upper end of the mounting post.

BRIEF DESCRIPTION OF THE DRAWINGS

FIG. 1 is a perspective view of a solar collector mounted on a mounting post therefor by a collector stand constructed in accordance with the invention.

FIG. 2 is an enlarged elevation view of the solar collector, collector stand and mounting post therefore shown in FIG. 1.

FIG. 3 is a partial section view of the collector stand structure and mounting post illustrated in FIG. 2, taken substantially on the line 3—3 in FIG 2.

FIG. 4 is a partial section view of the collector stand structure illustrated in FIG. 2, taken substantially on the line 4—4 in FIG. 2.

FIG. 5 is a partial section view of the collector stand structure illustrated in FIG. 2, taken substantially on the line 5—5 in FIG. 2.

FIG. 6 is an elevation view of the collector stand structure illustrated in FIG. 2, taken substantially in the direction of arrow 6 in FIG. 2.

FIG. 7 is an elevation view of a modification of the collector stand illustrated in FIG. 2.

FIG. 8 is a partial section view of the modified collector stand structure illustrated in FIG. 7, taken substantially on the line 8—8 in FIG. 7.

FIG. 9 is a partial section view of the modified collector stand structure illustrated in FIG. 7, taken substantially on the line 9—9 in FIG. 7.

DESCRIPTION OF THE PREFERRED EMBODIMENT

The collector stand 10 shown best in FIG. 2 is utilized to efficiently secure a solar collector 12 to a mounting post 14 therefor.

The collector stand 10 includes a frame 16 adapted to be secured to the solar collector 12, an end cap 18 adapted to be secured to the frame 16 and to be sleeved over the upper end 20 of the mounting post 14, and means 22 for securing the frame 16 to the mounting post 14 in spaced relation to the end cap 18.

More specifically, the frame 16 includes upper and lower parallel collector angle iron members 24 and 26, respectively, adapted to be secured by convenient means such as bolts or welding (not shown) to the solar collector structure 12. Frame 16 further includes the post angle iron member 28 extending adjacent to and in parallel relation with the post 14. An upper channel iron member 30, best shown in FIG. 5, is secured to the end cap 18 at one end thereof and to the upper collector angle iron member 24 at the other end thereof by convenient means such as welding. Upper bracing angle iron members 32 and 34 are also secured to the end cap 18 at one end thereof and to the upper collector angle iron member 24 at the other end thereof in spaced relation to the other end of the upper channel iron member 30, as shown best in FIG. 4. A lower channel iron member 36 extends from the semi-cylindrical abutment member 46 of the means 22 for securing the frame 16 to the post 14 at one end to the lower collector angle iron member 26 at the other end. The lower bracing angle iron members 38 and 40, as best shown in FIG. 6, extend from the semi-cylindrical abutment member 46 at one end to the lower angle iron member 26 at the other end thereof in spaced relation to the other end of the lower channel iron member 36. Again, the lower channel iron and bracing angle iron members are secured to the lower collector angle iron member 26 and to the abutment member 46 by convenient means such as welding. Central bracing angle iron members 42 and 44 extend from the post angle iron member at one end substantially centrally thereof to the lower collector angle iron member 26 at their other ends adjacent the other ends of the lower bracing angle iron members, as shown best in FIG. 6.

The end cap 18 is a cylindrical member adapted to fit over the end 20 of the mounting post 14 and is closed at the upper end 21 thereof. The end cap 18 is rigidly secured to the adjacent ends of the upper channel iron and bracing angle iron members and to the upper end of the post angle iron member by convenient means such as welding.

The means 22 for securing the frame 16 to the mounting post 14 in spaced relation to the end cap 18 includes the semi-cylindrical abutment member 46 which again may be welded to the adjacent ends of the post angle iron member and the lower channel and bracing angle iron members. The means 22 further includes the collar 48 which extends around the post 14 and the semi-cylindrical abutment member 46, as shown best in FIGS. 2 and 3. The collar 48 is secured in position by convenient means such as bolt 50.

In the modification of the collector stand 10, illustrated in FIGS. 7–9, wherein similar parts are provided with similar reference numerals, a pivot connection 52 is provided between the end cap 18 and the secured together ends of the post angle iron member 28 and the upper channel iron and bracing angle iron members 30, 32, 34, as shown in detail in FIGS. 7 and 8. Further, in the embodiment of the invention illustrated in FIGS. 7–9, an adjustable connection is provided between the frame 16 at the bottom thereof and the semicylindrical abutment member 46 by means of a bracket 54 secured to the bottom of the frame 16 and an elongated arcuate bracket 56 secured to the semicylindrical abutment member 46 which brackets 54 and 56 may be connected in variable positions of the solar collector with respect to the mounting post by convenient means such as the bolt 58.

With the collector stand of the invention, when it is desired to mount the solar collector 12 on the post 14, the frame 16 is produced with the end cap 18 and the abutment member 46 secured thereto, and is secured to the solar collector 12. It is then necessary to lift the solar collector 12 with the frame attached thereto only high enough so that the cylindrical end portion of the end cap 18 is sleeved over the end 20 of the mounting post 14. At this time, the weight of the solar collector 12 will urge the abutment member 46 into engagement with the mounting post 14 at a point in spaced relation with end cap 18 due to the end cap being higher than the center of gravity of the solar collector. However, if it is desired to more securely fasten the frame 16 to the post 14, the collar 48 may be installed.

If, as indicated above, it is considered desirable to vary the angle between the solar collector 12 and the mounting post 14 periodically, the modification of the invention illustrated in FIGS. 7–9 is installed in the same manner. In use, when it is desired to change the angle of the solar collector 12, the bolt 58 is removed and the solar collector is pivoted about the pivot connection 52 to align desired openings in the brackets 54 and 56 and the bolt 58 is repositioned in the newly aligned openings.

While one embodiment of the present invention has been considered in detail, together with a modification thereof, it will be understood that other embodiments and modifications of the invention are contemplated. It is the intention to include all the embodiments and modifications of the invention as are defined by the appended claims within the scope of the invention.

We claim:

1. A vertical post, one end of which is stationarily mounted, a solar collector positioned adjacent said post and at an oblique angle thereto, a frame secured to the collector including a pair of parallel collector angle iron members fastened to the collector, the lower of which is positioned adjacent the lower edge of the collector and the upper of which is positioned above the center of gravity of the collector, a post angle iron member extending adjacent to and parallel to the post, an upper iron channel member extending between the upper end of the post angle iron member at one end and the upper collector angle iron member at the other end, a pair of upper angle iron bracing members extending at one end from the upper end of the post angle iron member to the upper collector angle iron member at the other end in spaced relation to the other end of the upper channel iron member, a bottom channel iron member extending at one end from the other end of the post angle iron member to the lower collector angle iron member at the other end thereof, a pair of lower angle iron bracing members extending at one end from the lower end of the post angle iron member to the lower collector angle iron member at the other end thereof in spaced relation to the other end of the lower channel iron member, and a pair of central angle iron bracing members extending from the post angle iron member at one end to the lower collector angle iron member at the other end adjacent to the other end of the lower angle iron bracing members an end cap in the form of a cylinder closed at one end secured to the frame adjacent the upper end of the post angle iron member and sleeved over the upper end of the post, a semi-cylindrical abutment member secured to the other end of the post angle iron member adapted to abut the post in spaced relation to the end cap, and a collar securing the semi-cylindrical abutment member to the post.

2. Structure as set forth in claim 1, wherein the end cap and the semi-cylindrical member are rigidly secured to the opposite ends of the post angle iron member.

3. Structure as set forth in claim 1, wherein the end cap is pivotally secured to the upper end of the post angle iron member and the semi-cylindrical abutment member is adjustably secured to the frame in spaced relation to the end cap.

4. A stand for a solar collector or the like for securing a solar collector to a post, comprising a frame adapted to be secured to the solar collector, an end cap secured to the frame adapted to be fitted over the end of the post, and means for securing the frame to the post at the point in spaced relation to the end cap, wherein the frame comprises an upper and lower parallel collector angle iron member adapted to be secured to the solar collector, as post angle iron member adapted to extend parallel to and adjacent the post, an upper channel iron member extending between the end cap at one end and the upper collector angle iron member at the other end centrally of the collector structure, two upper angle iron bracing members extending from the one end of the upper channel iron member at one end to the upper collector angle iron member at the other end in spaced relation to the other end of the upper channel iron member, a lower channel iron member extending between the means for securing the frame to the post at one end and the lower collector angle iron member at the other end, a pair of lower bracing channel iron members extending from said one end of the lower channel iron member to the lower collector channel iron member in spaced relation to the other end of the lower channel iron member, and a pair of central angle iron bracing members extending at one end from the post angle iron member centrally thereof to the lower collector angle iron member adjacent the other ends of the lower angle iron bracing members, all of said channel iron and angle iron members being rigidly secured together.

* * * * *